United States Patent [19]

Berdat

[11] 4,343,540
[45] Aug. 10, 1982

[54] PLOTTING APPARATUS AND METHOD UTILIZING ENCODED OPTICAL MEANS

[75] Inventor: Henry F. Berdat, Manchester, Conn.

[73] Assignee: The Gerber Scientific Instrument Company, South Windsor, Conn.

[21] Appl. No.: 235,170

[22] Filed: Feb. 17, 1981

[51] Int. Cl.$^3$ .............................................. G03B 41/00
[52] U.S. Cl. ........................................................ 354/4
[58] Field of Search ........................................ 354/4, 7

[56] References Cited

U.S. PATENT DOCUMENTS 4,209,239  6/1980  Wood et al. ............................. 354/4

*Primary Examiner*—Michael L. Gellner

*Attorney, Agent, or Firm*—McCormick, Paulding & Huber

[57] ABSTRACT

A plotting apparatus for plotting on a light sensitive material uses an optical head with an adjustable aperture plate to project a light beam through changeable apertures onto the light sensitive material. Encoding means are associated with the various apertures of the plate and comprise detectable indicia corresponding to the optical characteristics of the apertures. A detector on the optical head senses the indicia of the individual apertures as the plate is adjusted and sends signals corresponding to the identity of such characteristics to a control device responsible for adjustment of the plate or other component in the plotting apparatus.

19 Claims, 8 Drawing Figures

PLOTTING APPARATUS AND METHOD UTILIZING ENCODED OPTICAL MEANS

BACKGROUND OF THE INVENTION

The method and apparatus of the present invention relates to plotters which may be used for generating images or drawing lines on light sensitive material by means of a light beam or spot movable over the light sensitive material. In prior art plotting apparatus such as disclosed in U.S. Pat. Nos. 3,330,182 and 4,209,239 and having the same assignee as the present invention, an optical light head is moved relative to a sheet of light sensitive material and selectively exposes the material in order to produce a plot of graphic information. The selective exposure occurs by projection of a beam of light from the head onto the sheet material to produce a light spot and then moving the sheet material and light head relative to one another to move the spot along a predetermined path and expose the sheet material correspondingly. The exposed material, when photographically developed, bears a line trace corresponding to the path traversed by the light spot and having a width corresponding to the width of the spot. Line traces can also be produced by flashes of the light beam at consecutive positions on the sheet material. Additionally, individual flashes at selected locations on the sheet material expose the light sensitive material in accordance with the shape of the light spot.

In U.S. Pat. Nos. 3,330,182 and 4,209,239, referenced above, an aperture plate is provided in the plotting apparatus with a plurality of individual apertures of different sizes and shapes. The apertures are situated in a serial array on the aperture plate so that plate movement brings the apertures individually into a position between a light source in the light head and light sensitive material. When the plotting apparatus is in operation, the light source projects a light beam through a selected aperture and, by suitable optical means, the image of the aperture is focused onto the light sensitive material so that the size and shape of the aperture determines the graphic image produced.

Movement of the plate having the plurality of apertures, as in the referenced patents may be accomplished by use of a drive mechanism, such as a drive motor with suitable gearing, which engages the plate. The drive mechanism is controlled by a device, such as a computer, which is programmed to cause a desired aperture to be positioned in the path of the projecting light beam. Commonly, the device controlling the photoplotting operation is programmed to position the aperture plate in accordance with a particular location in the array of apertures where a desired aperture is expected to be. Should the desired aperture not be positioned in the programmed location, the controlling device does not recognize the problem, and the plotting operation continues in error. Since several adjustable image characteristics and the final plot are dependent upon the desired aperture being in its programmed location in the array, faulty line traces on the sheet material result if the apertures are improperly placed or missing.

It is, therefore, a general object of the present invention to provide a plotting apparatus and method for changing the characteristics of the image projected onto a light sensitive material by basing the control of the image-generating operation upon identification of individual image characteristics produced by the optical head.

It is a further object of the invention to incorporate into the plotting apparatus a system which causes adjustment of the light characteristics or other components in the apparatus to be based on the identity of optical modifiers in the head.

SUMMARY OF THE INVENTION

The present invention relates to a plotting apparatus and method for generating images on a light sensitive material with a beam of light.

The apparatus of this invention includes a light projecting device from which a light beam is directed toward a sheet of light sensitive material. The light projecting device is mounted for movement relative to the sheet material so that the light beam exposes selected locations on the material. Optical means are supported in the path of the light beam for adjusting characteristics of the image cast onto the material. The optical means is supported for movement relative to the light beam by a drive motor and suitable gearing or other mechanism, and may for example, have a plate with a plurality of slides defining apertures. The apertures are arranged in a serial array and each has a particular size and shape different from the other apertures. Encoding means are provided in the optical means and include indentifying indicia which correspond with the light beam characteristics provided, for example, by the apertures. Detector means assocated with the optical means senses the identifying indicia of the encoding means and produces signals corresponding to that indicia. A device in the apparatus responsible for controlling the image-generating operation receives the signals from the detector means and controls the operation accordingly.

Control of the image-generating operation can be accomplished in many ways with the detector means which senses the identity of the apertures or other optical characteristics affecting the light beam. For example, the control device may be programmed to cause scanning movement of the optical means until a desired aperture is found. Thus dependency on the position of the desired aperture as in the prior art is obviated. However, should the programmed selection be dependent on aperture position in the array, the encoding means allows the correct selection and positioning to be verified within the control device.

In an open loop system, the control device of the apparatus is programmed to modify the characteristics of the generated image unrelated to the optical means. Such characteristics include the rate of speed of the light beam relative to the surface of the light sensitive material, or the setting of a variable density filter which changes the intensity of the image. Although adjustment or modification of such characteristics is accomplished remotely of the optical means, each is based on the indentity, as sensed by the detector means, of the aperture positioned in the light beam.

The method of this invention includes the step of generating images on the light sensitive material utilizing the apparatus of this invention. A light beam is directed onto a light sensitive material and optical means are placed in the path of the light beam to adjust several identifiable characteristics in the beam and the image produced on the material. The identifiable characteristics are sensed from encoding means associated with the optical means, and the sensed characteristics are utilized by a control device responsible for the control of the image-generating operation.

DETAILED DESCRIPTION OF THE PREFERRED EMBODIMENT

Figure 1:
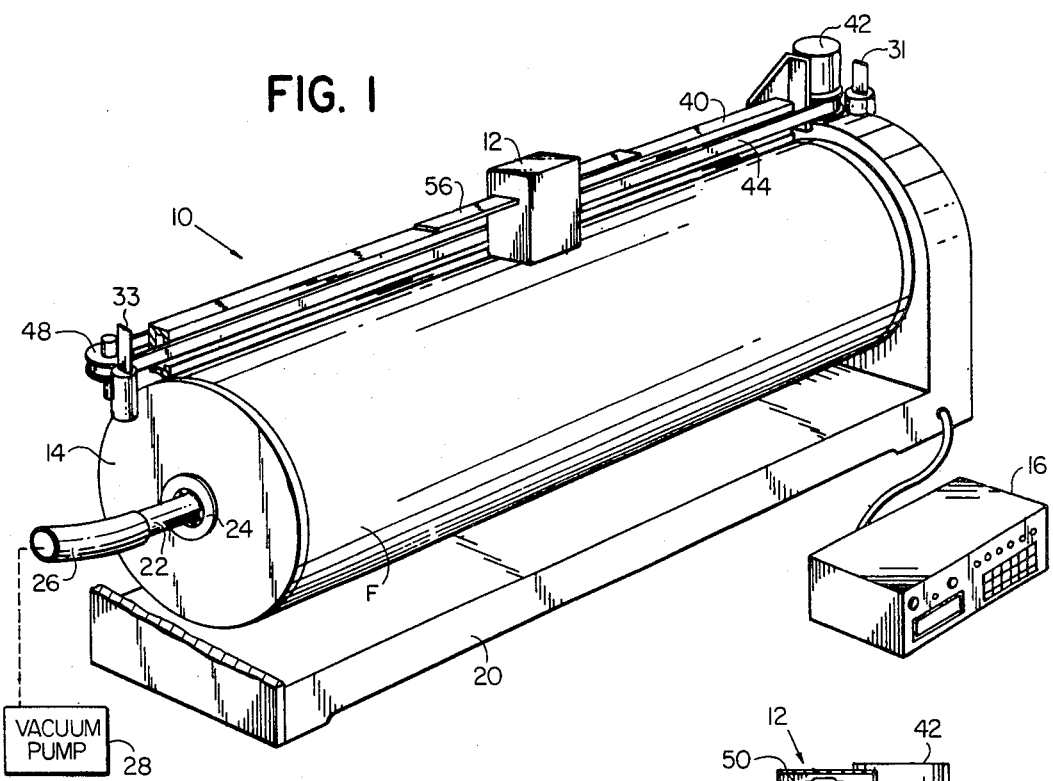
FIG. 1 is a perspective view illustrating a drum plotter in which the present invention is employed.

FIG. 1 illustrates a drum plotter, generally designated 10, incorporating the present invention. The drum plotter is an automatically controlled apparatus which includes a plotting instrument such as the head 12 for generating graphic images on a workpiece such as a sheet of plotting material mounted on a round support bed or drum 14. In the illustrated embodiment of the invention, the plotting head 12 is a photo-optical light head that produces a beam of light and projects the beam downwardly toward the drum 14 and the sheet of plotting material which is a light-sensitive film F. In operation, the plotter 10 is positioned in a low-light level room and the beam of the light from the plotting head 12 is projected onto a spot on the film. The film is secured to the drum 14 in a flat condition, and the head 12 and the drum are moved relative to one another so that the spot of light can be translated to various locations over the film. The plotting head can flash an internal light source on and off so that the graphic image exposed by the spot on the film is produced singly or repetitively, or the spot may be continuously illuminated as relative motion occurs. A control computer 16 connected with the plotter 10 is operated by a program which determines the manner of excitation of the beam and the relative movement of the plotting head and film to expose the film in a predetermined fashion corresponding to the graphic images desired. For example, the film can be used to produce mechanical drawings, maps, electrical diagrams, printed matter, and a multitude of other products.

While the invention is described and illustrated on a drum plotter; it should be understood that the invention can also be employed in flat bed and other types of photoplotters.

The plotting drum 14 on which the film is mounted is supported in a frame 20 for rotation about the central axis of the drum. As viewed in FIG. 1, the frame 20 is broken away at the near end to expose a shaft 22 and bearings 24 which mount the drum for rotation on the shaft. The cylindrical surface of the drum may be provided with a plurality of fine apertures distributed over the region on which the film is mounted to hold the film in place on the drum when a vacuum is drawn through the apertures from inside the drum. For this purpose, the shaft 22 extending inside the drum is hollow and is connected at the near end in FIG. 1 to a vacuum hose 26 and a vacuum pump 28.

Figure 2:
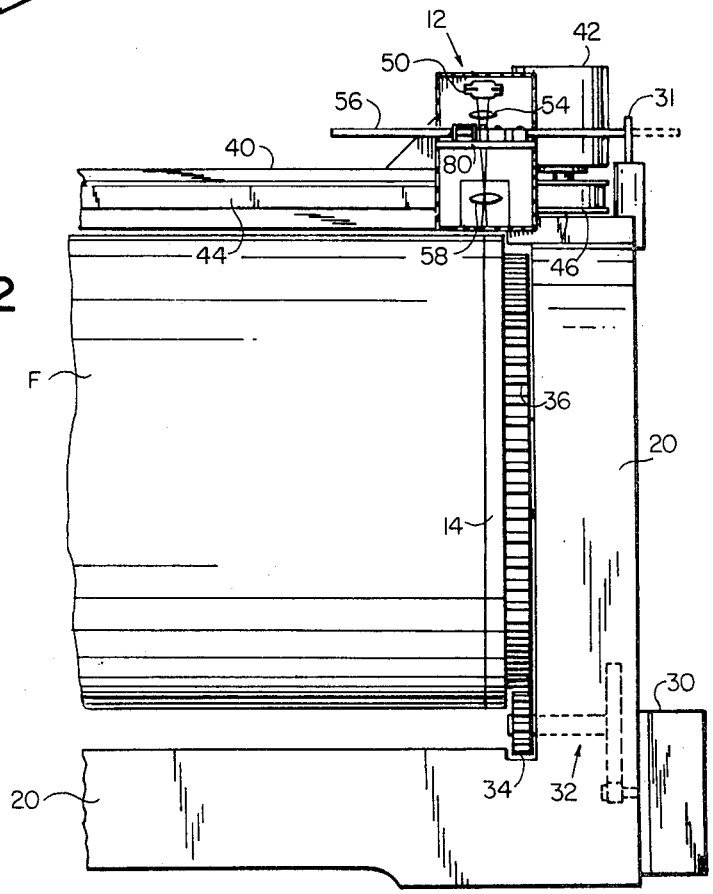
FIG. 2 is a partial front elevation view of the drum plotter at one side and illustrates the optical light head.

As shown in FIG. 2, the drum 14 is rotatably driven about its central axis by means of a reversible drive motor 30 and a transmission 32 having a pinion gear 34 engaging the large ring gear 36 attached to the illustrated end of the drum. The drive motor 30 receives command signals from the computer 16 in FIG. 1 and rotates the drum and the film F mounted on the cylindrical drum surface relative to the plotting head 12 supported above the drum.

The plotting head 12 is mounted for movement along a support beam or rail 40 connected to the frame above the plotting drum 14. Suitable bearings attached to the head 12 engage the rail 40 so that the head is accurately guided along the rail at a predetermined distance above the cylindrical surface of the drum.

Another reversible drive motor 42 is mounted to the frame 20 at one end of the drum and is connected in driving engagement with the plotting head 12 by means of a toothed drive belt 44 and a drive pulley 46 on the motor shaft. At the opposite end of the support rail, the drive belt is mounted on an idler pulley 48. With the plotting head 12 mounted to move back and forth on the support rail 40, positioning command signals are supplied to the drive motor 42 and accurately position the plotting head on the rail beam at various positions above the drum 14 and light sensitive film F.

It should be understood that by translating the plotting head 12 on the support rail and rotating the drum 14, the drive motors 30 and 42 in response to the positioning command signals of the computer 16 move the head and film relative to one another to any given point on the film. Thus, the spot of light generated by the head photographically exposes the light-sensitive film F with programmed graphic information and the film when developed as a positive or negative produces a visual image of the information. For a more complete description of a drum plotter of this type and positioning control for the plotter, reference may be had to U.S. Pat. No. 3,984,747.

As shown in FIG. 2, the plotting head 12 includes a light source 50 which is typically a xenon flash lamp having two space electrodes within a glass envelope. Light from the source is directed as a beam toward the cylindrical surface of the drum and the light-sensitive film F. The light beam passes through an optical system including a condensing lens 54, an aperture plate 56, and a projecting or objecting lens 58. The condensing lens 54 which may be a compound lens system concentrates the light from the source on one particular area of the aperture plate in a "confused" or unfocused condition. The aperture plate 56, shown in greater detail in FIG. 3, has a plurality of aperture slides 95–101 which are arrayed in a linear array or series on the plate. The aperture slides determine the size and shape of the image cast by the light beam on the light sensitive film F.

In the embodiment of the invention illustrated in FIG. 2, the aperture plate 56 is mechanically supported in the plotting head 12 on a mounting base 80. The mounting mechanism supporting the plate permit the plate to shift relative to the mounting base 80 in a direction parallel to the linear series of aperture slides and move a selected slide into registration with the beam of light projected on the film F. For a more complete description of the aperture plate support in this embodiment of the invention, reference may be had to U.S. Pat.

No. 4,209,239. Movement of the plotting head 12, along the rail 40 allows one end of the aperture plate 56 to engage a solenoid-activated stop pin 31 or 33 at the ends of the rail. If the plotting head 12 continues to move a predetermined amount toward the engaged stop pin, the aperture plate shifts relative to the rest of the plotting head 12 so that a different aperture slide is positioned in registration with the light beam and changes the beam characteristics.

Figure 3:
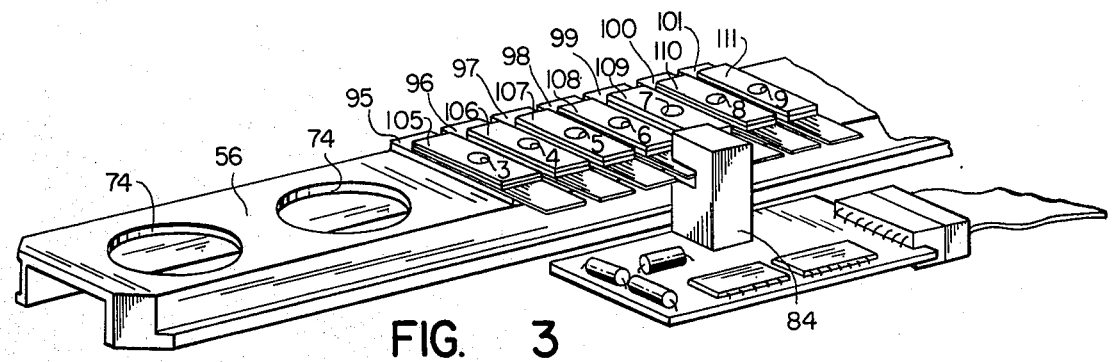
FIG. 3 is a perspective view of an aperture plate having encoded aperture slides and a detector sensing the aperture codes.

As shown in FIG. 3, the elongated aperture plate 56 defines a series of openings 74,74 through the illustrated end of the plate. Mounted on the plate and across the large openings 74,74 is the plurality of aperture slides 95–101 distributed serially in a linear array. Each aperture slide includes an elongated base member which is fastened to the aperture plate 56 by a pair of aperture plate alignment pins (not shown). Typical base members 102,103 are shown in detail in FIGS. 4 and 5, and the alignment pins for positioning and fastening the slides on the base plate are received in the openings 60,61 located near the opposite ends of each base member. An additional larger opening 62 or 64 is defined in the central region of each base member so that the additional opening is positioned over an opening 74 in the aperture plate 56 when an aperture slide is mounted on the plate.

The aperture slides 95–101 shown mounted on the aperture plate 56 in FIG. 3 also include a plurality of masks 105–111 respectively. Each mask is in the form of a coated plate, and is preferably made of glass or plastic. One of the surfaces of each mask is colored or coated over a major portion of the surface area so that this major portion is opaque to light. A smaller portion of the mask surface located near the center within the aforementioned opaque portion is transparent to light, thus defining an aperture in each mask. Referring to FIG. 3, apertures 3–9 are shown defined on masks 105–111, respectively. The mask is positioned on the base member so that the transparent portion is aligned with the additional opening 62 or 64, and with the slide properly mounted over a large opening 74 in the aperture plate, the light beam passes through the slide and plate before reaching the film. Since the transparent portion of the mask defines the smallest aperture through which the light beam passes, the size and shape of the aperture determines the size of the light spot produced and exposed on the film.

Each aperture slide 95–101 shown mounted on the aperture plate 56, has associated encoding means for indentifying the characteristics of the light spot provided by the mask aperture on the respective slide. The encoding means of the slides may be dectectable indicia of various forms but preferably comprise code groups. In the preferred embodiment, each aperture slide has one code group which represents information regarding the mask aperture, that is, size and shape. Thus, the slides having different sizes or shapes have different code groups.

Figure 4:
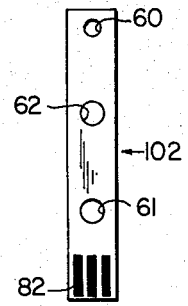
FIG. 4 is a plan view illustrating one aperture slide with an aperture code.
Figure 5:
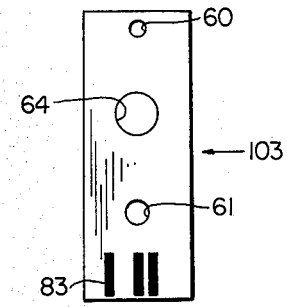
FIG. 5 is a plan view illustrating a second aperture slide with a different aperture code.

In FIGS. 4 and 5, the code groups 82,83 are shown on the base members 102 and 103 respectively as linear arrays of bars. Such arrays of bars can be read by suitable reflected light detectors such as the type used in conventional bar code readers. Alternatively, the projecting portions of the base members bearing the code groups may be transparent for reading by photocells. In binary coding, the three bars illustrated on the base member 102 of FIG. 4 represent the number 0111 while the code group on the base member 103 in FIG. 5 represents the binary number 1011. With a maximum of four digits or bars in each group, as many as sixteen (16) apertures may be identified by the code groups. The precise relationship between the binary code and the physical dimensions or configuration of the apertures need not be mathematical, but can be arbitrary and must be unique if the code information is to be utilized to distinguish one aperture from another.

In FIG. 3, the coded end of the base member for one aperture slide 98 is shown received in a detector head 84. The detector head 84 is fixed in stationary relationship on the light head 12 and receives the end of the aperture slide which has been shifted into registration with the light beam. Movement of the aperture plate 56 bringing a different aperture slide in registration with the light beam positions a different code group in the detector head. The detector head 84 with its associated circuitry senses the code group on the aperture slide and generates identifying signals corresponding to the respective code group. In the preferred embodiment, the detector head 84 is a light sensor having an internal light source above the slides and photocells below that read each bar position or digit in the code group when an aperture slide is in the beam modulating position. The signals generated are used for the plotting operation as will be hereinafter described.

The apparatus utilizing the invention includes a control device such as the control computer 16 in FIG. 1 for controlling the image-generating operation. The systems in which the invention is employed by the control computer are varied and several examples are illustrated in FIGS. 6–8.

Figure 6:
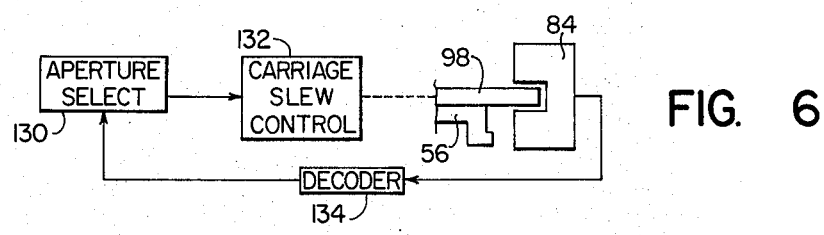
FIG. 6 is a control diagram showing one embodiment of the invention.

One system in which the coded aperture slides on the plate 56 are used in a closed control loop is illustrated by the control schematic of FIG. 6. In essence the system depicted is one in which the aperture slide slide 98 positioned in registration with the light beam is verified to be the aperture anticipated to be in a commanded position on the plate by the aperture selector 130 of the control computer. In the plotting apparatus utilizing this control scheme, command signals which originate in the aperture selector 130 energize the carriage slew controls 132 which move the plotting head along the rail 40 and causes the aperture plate 56 when moved into abutment with one of the stop pins 31 or 33 in FIG. 1 to shift in the plotting head until a commanded slide position is in registration with the light beam path. The detector head 84 senses the code group of the aperture slide 98 in the commanded position and sends to a decoder 134 in the control computer binary coded signals corresponding to that sensed coded group. The decoder 134 decodes the signals to determine the indentity of the aperture slide in the commanded position, and the aperture selection 130 then compares that identity with the pre-programmed identity. If the indentities match, the image-generating operation continues; but if the identities do not match, the computer interrupts or discontinues the operation and generates a fault signal.

Figure 7:
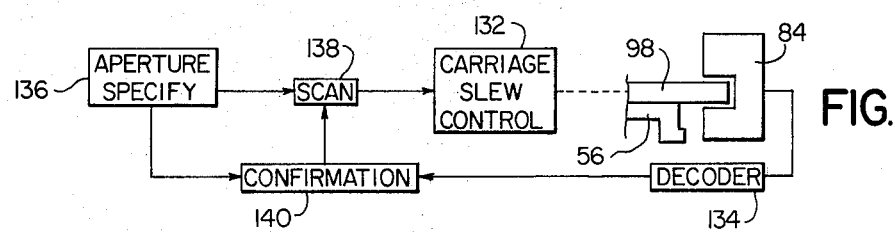
FIG. 7 is a control diagram showing another embodiment of the invention.

FIG. 7 illustrates an example of another closed-loop control scheme in which the position of a commanded aperture slide on the aperture plate need not be known. In essence, the operation depicted by this control scheme is one in which the aperture specifying control 136 specifies a desired aperture from the program by size, number or other symbol, and the controls then find the specified slide on the aperture plate 56 and set the slide in registration with the light beam. The specifying control 136 sends command signals to the aperture plate scanner 138, and the scanner actuates the carriage slew control 132 to begin shifting the aperture plate and the slides past the detector head 84. The detector head senses the code group of each aperture slide which it receives in passing and generates coded signals which are processed by the decoder 134 for identification of each passing aperture slide. The confirmation circuit 140 compares each identified aperture slide with the aperture specified by the control 136, and if the circuit determines that the compared apertures do not match, the aperture plate continues to shift and the slides continue to be scanned until the desired aperture is sensed. At that time the confirmation circuit interrupts the scanner 138 and stops shifting of the plate 56 with the specified slide locked in registration with the light beam. With the aperture plate locked in position, the image-generating operation proceeds.

Figure 8:
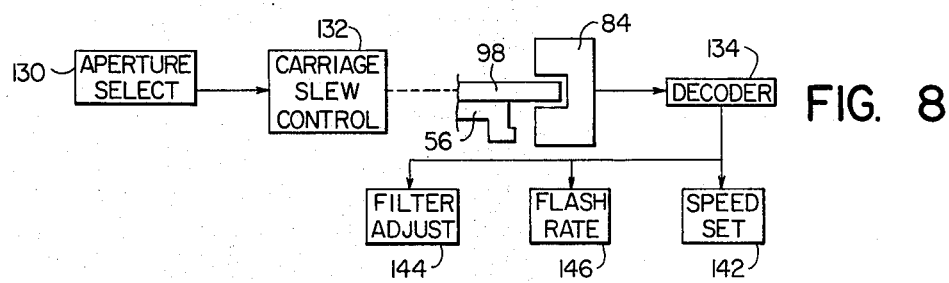
FIG. 8 is a control diagram showing still another embodiment of the invention.

An open loop system utilizing this invention is illustrated in FIG. 8. The operation depicted in FIG. 8 indicates that the aperture identifying signals from the decoder 134 are used to modify other settings in the plotter which change characteristics of the generated image related to the aperture slides. Such settings include the maximum speed setting 142 of the light beam relative to the surface of the light sensitive material or the adjustment 144 of a variable density filter which changes the intensity of the image. The setting of a flash rate 146 of the light source is illustrated as an additional characteristic capable of adjustment since images in some types of plotting apparatus are generated by a series of overlapping light flashes. In essence, the operation depicted in FIG. 8 indicates that the carriage slew control is energized to bring a particular aperture slide into registration with the light beam and to make one of the aforementioned settings in response to the sensed identity of the aperture slide.

Since the aforementioned description and control scheme are intended as illustrations and not as limitations, it will be understood that numerous modifications may be made to the image-generating apparatus without departing from the spirit of the invention. For example, the adjusted optical device is not limited to an aperture plate which determines the size and shape of the light beam image but may also be employed for adjusting the image intensity, color or focus. A particular color, intensity or focus can be produced by providing coded filter plates or lens systems which are monitored by the detector head for image control. Accordingly, the invention has a number of applications other than those specifically disclosed.

I claim:

1. A recording apparatus for generating images on a photosensitive material comrising:
    light projecting means having a source of light and means for directing light rays in a beam from the source onto a photosensitive material;
    optical means supported in the path of the light rays from the source and having light modifying means with adjustable characteristics for modifying the light rays directed from the source onto the photosensitive material;
    control means connected to the optical means for adjusting the characteristics of the light modifying means;
    encoding means associated with the optical means and including detectable indicia corresponding to the adjustable light modification characteristics of the light modifying means; and
    detector means associated with the encoding means for sensing the detectable indicia and producing signals corresponding to the detectable indicia and the adjusted light modification characteristics of the light modifying means.

2. A recording apparatus for generating images on a photosensitive material as defined in claim 1 wherein the light modifying means includes a plurality of light beam modulators arranged in a spaced and serial array; the control means is connected to the array of modulators for adjusting of the modulations singly into and out of the light ray path; and the detector means cooperates with the encoding means to sense the detectable indicia of the single light beam modulator in the light ray path.

3. A recording apparatus for generating images on a photosensitive material as defined in claim 1 wherein the detectable indicia of the encoding means comprise code groups, each of the code groups representing information unique to one of the adjusted light characteristics of the light modifying means.

4. A recording apparatus for generating images on a photosensitive material as defined in claim 3 wherein the light modifying means includes a plurality of light beam modulators, each of the light beam modulators having an associated code group.

5. A recording apparatus for generating images on a photosensitive material as defined in claim 4 wherein each light beam modulator is a slide defining an aperture for passage of the light rays and wherein the information represented by the code group associated with each light beam modulator identifies the aperture characteristics.

6. A recording apparatus for generating images on a photosensitive material as defined in claim 1 wherein the control means is connected with the detector means and responsive to the signals produced by the detector means for controlling the image generating operation.

7. A recording apparatus for generating images on a photosensitive material as defined in claim 1 wherein the detector means comprises sensing means for sensing the detector indicia and decoding means responsive to the sensing means for producing the signals corresponding to the detected indicia.

8. A recording apparatus for generating images on a photosensitive material as defined in claim 7 wherein the sensing means for sensing the detectable indicia is a light sensor and the detectable indicia are light modulators.

9. A photoplotting apparatus for exposing images on a photosensitive film comprising:
    light projecting means having a source of light and means for directing a beam of light from the source onto the photosensitive film to form an image;
    motive means supporting the light projecting means and the photosensitive film for movement relative to one another;
    a plurality of light beam modulators mounted with the light projecting means and between the light projecting means and the photosensitive film for movement of the beam modulators individually into and out of the light beam to modulate the light falling on the film;
    coding means associated with each of the beam modulators for uniquely identifying each of the modulators;
    detecting means supported in the plotting apparatus for sensing the coding means on an individual modulator when positioned in the beam and generating an identifying signal corresponding to the individual modulator; and control means connected to the detecting means and responsive to the indentifying signal for controlling the plotting operation.

10. A photoplotting apparatus for exposing images on a photosensitive film as described in claim 9 further comprising means for moving the light beam modulators relative to the light beam and wherein the control means is connected in controlling relationship to the beam modulator moving means to position a desired beam modulator in the light beam.

11. A photoplotting apparatus for exposing images on a photosensitive film as described in claim 9 or claim 10 wherein the control means includes means for confirming the indentity of the light beam modulator positioned in the light beam as the desired beam modulator.

12. A photosensitive apparatus for exposing images on a photosensitive film as described in claim 9 wherein the motive means for movement of the light projecting means and the photosensitive film relative to one another includes means for varying the rate of relative movement, and wherein the control means is connected in controlling relationship to the means for varying to establish a desired rate of relative movement.

13. A photoplotting apparatus for exposing images on a photosensitive film as described in claim 9 wherein the light projecting means includes means for flashing the source of light at adjustable rates, and means for adjusting the flashing rate, and wherein the control means is connected in controlling relationship to the means for adjusting to establish a desired flash rate.

14. A photoplotting apparatus for exposing images on a photosensitive film as described in claim 9 further comprising means for varying a characteristic of the image formed by the light beam and wherein the control means is connected in controlling relationship to the image characteristic varying means for setting a desired characteristic of the image in response to the indentifying signals of the coding means.

15. A photoplotting apparatus for exposing images on a photosensitive film as described in claim 14 wherein the means for varying a characteristic of the light beam image includes means for adjusting the exposure of the image on the photosensitive film.

16. A photoplotting apparatus for exposing images on a photosensitive film as described in claim 14 wherein the means for varying a characteristic of the light beam image includes light filtering means for filter modulation of the beam and means for varying the amount of filter modulation.

17. In a photoplotter having a light projecting device which directs a light ray into a spot on a light sensitive material, means for moving the light spot over the material for the purpose of exposing a line on the material, and adjustable means having a plurality of aperture slides movable into the light ray one at a time for defining the shape and size of the light spot, the improvement comprising:

encoding means affixed to each of the aperture slides and having codes identifying the aperture in each slide; and detecting means for reading the codes of the slides and producing a corresponding aperture signal.

18. A method for generating images on a photosensitive material, the method including the steps of:

providing a photosensitive material and a light source, directing light rays onto the photosensitive material, providing adjustable optical means in the path of the light rays for modifying the light rays, encoding the adjustable optical means with detectable indicia corresponding to adjustable light modification characteristics produced by the adjustable optical means, adjusting the characteristics of the optical means to obtain a desired adjustment of the light rays, sensing the detectable indicia of the optical means and producing signals corresponding to the detectable indicia and adjusted light rays, and controlling the adjustment of characteristics of the optical means and the images on the photosensitive material in response to the produced signals.

19. A method of exposing images on photosensitive film, the method including the steps of:

supporting a light projecting device for movement relative to a photosensitive film, directing a beam of light from the light projecting device onto the photosensitive film to form an image, supporting a plurality of discrete light beam modulators between the light projecting device and the photosensitive film for movement of the modulators into and out of the light beam to modulate the light falling on the film, each light beam modulator having encoding means for uniquely identifying the modulators, sensing the encoding means on the modulator positioned in the light beam and generating an identifying signal corresponding to the modulator, and controlling the plotting operation in response to the generated identifying signals.

* * * * *